Jan. 3, 1967  M. A. ORDORICA ETAL  3,295,625
AUTOMATIC FOUR-WHEEL DRIVE TRANSFER CASE
Filed June 16, 1964
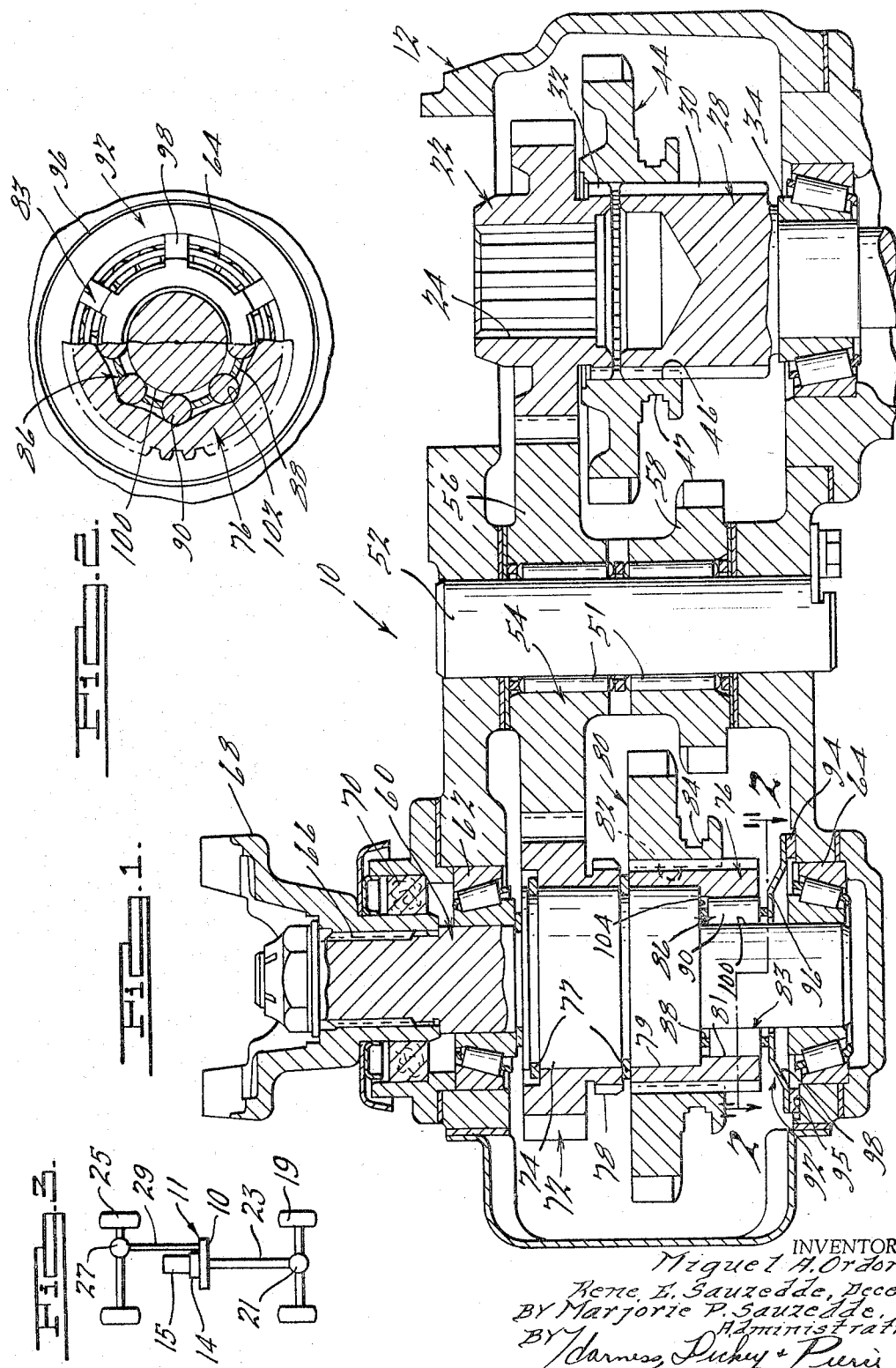
INVENTORS.
Miguel A. Ordorica
Rene L. Sauzedde, Deceased
BY Marjorie P. Sauzedde,
Administratrix.
BY Harness, Dickey & Pierce
ATTORNEYS.

United States Patent Office 3,295,625
Patented Jan. 3, 1967

3,295,625
AUTOMATIC FOUR-WHEEL DRIVE
TRANSFER CASE
Miguel A. Ordorica, Lambertville, Mich., and Rene E. Sauzedde, deceased, late of Terryville, Conn., by Marjorie P. Sauzedde, administratrix, Terryville, Conn., assignors to Kaiser Jeep Corporation, Toledo, Ohio, a corporation of Nevada, and General Motors Corporation, Detroit, Mich., a corporation of Delaware
Filed June 16, 1964, Ser. No. 376,305
10 Claims. (Cl. 180—44)

This invention relates to transmissions for four wheel drive vehicles and more particularly to transfer case constructions for an automotive vehicle.

With four wheel drive vehicles it is desirable that the vehicle be in two wheel drive when driving on relatively smooth roads and shift automatically into four wheel drive when the powered wheels begin to slip, as in climbing steep grades, etc. It is also desirable that this occur with the vehicle in either forward or reverse. In prior constructions such automatic shifting in forward and reverse has been done by complex linkages and mechanisms. Therefore it is an object of the present invention to provide an improved transmission capable of automatically shifting between two and four wheel drive.

The present invention is shown in conjunction with a transfer case assembly. With prior constructions separate mechanisms have been used for automatically shifting between two and four wheel drive for forward and reverse and these separate mechanisms require separate, shift linkages for their actuation. In the present invention, a construction is provided in which a single mechanism performs the shift between two and four wheel drive automatically and directly without the necessity for a shift linkage. Therefore, it is another object of this invention to provide an improved, simplified transmission for automatically shifting between two and four wheel drive directly in both forward and reverse without the necessity for external actuation.

It is also an object of this invention to provide a clutch of an improved construction for use with the transmission of this invention.

Other objects, features, and advantages of the present invention will become apparent from the subsequent description and the appended claims, taken in conjunction with the accompanying drawing, in which:

FIGURE 1 is a longitudinal sectional view of a transmission embodying features of the present invention, FIGURE 2 is a sectional view of the transmission of FIGURE 1 taken along the line 2—2; and FIGURE 3 is a view of a portion of a vehicle chassis for a four wheel drive vehicle.

Looking now to the drawing, a portion of a vehicle chassis for a four wheel drive vehicle is indicated by the numeral 11 and includes a transfer case 10 which is connected by a transmission output shaft (not shown) to a transmission 14. Both the transfer case 10 and transmission 14 are driven by an engine generally indicated by the numeral 15. The chassis 11 includes a set of rear wheels 19 and a differential 21 with a drive shaft 23 connecting the rear wheel differential 21 to the transfer case 10. A pair of front wheels 25 are driven by a differential 27 which is connected to the transfer case 10 by means of a drive shaft 29. The transfer case 10 includes an outer case assembly 12 with the transmission 14 having its output shaft (not shown) connected to a drive gear 22 through a splined central bore 24.

Axially spaced from and located coaxially relative to the drive gear 22 is a rear wheel drive spindle 28 which has an enlarged diameter splined portion 30 at one end disposed in juxtaposition with a reduced diameter externally splined portion 32 of the drive gear 22. The rear wheel drive spindle 28 is rotatably secured within the case or housing assembly 12 by roller bearings such as bearing 34. The rear wheel drive spindle 28 is connected to the rear wheels of the vehicle via a propeller shaft 23 and other conventional apparatus.

A rear wheel drive and connecting gear member 44 has a splined bore 46 which is matable with the enlarged splined portion 30 of the rear wheel drive spindle 28 and is likewise matable with the reduced diameter splined portion 32 of the drive gear 22. The gear member 44 has an annular groove 47 for receiving a bifurcated fork member (not shown) which can be manipulated by conventional means to move the gear member 44 axially along the splined portions 30 and 32. In the position as shown in FIGURE 1 with the gear member 44 in its forwardmost position, the drive gear 22 is then connected to the rear wheel drive spindle 28 thereby providing for power transfer to the rear wheels.

By moving the gear member 44 axially rearwardly along the splined portion 30 and out of engagement with the splined portion 32, the drive gear 22 is uncoupled from the rear wheel drive spindle 28, thereby disconnecting the power from the rear wheels. Thus in the two positions just described, the transfer case can transmit power to the rear wheels in direct (high) drive or can be placed in a neutral condition in which no power is transmitted to the rear wheels.

Fixed within the housing assembly 12 of transfer case 10 and eccentrically spaced from the rear wheel drive spindle 28 is a countershaft 52. Rotatably mounted via bearings 51 on the countershaft 52 is an intermediate gear member 54 which has a first gear section 56 maintained continuously in geared engagement with the drive gear 22. The intermediate gear member 54 also has a second gear section 58 which serves a purpose to be described.

Eccentrically displaced from the countershaft 52 is a front wheel drive spindle 60 which is rotatably supported within the housing assembly 12 via a pair of axially spaced roller bearing assemblies 62 and 64. The axially forward end of the spindle 60 terminates in a splined portion 66 onto which is matably splined a yoke 68 of a universal joint assembly (not shown) which is connected via a propeller shaft and other appropriate apparatus to the front wheels of the vehicle. An annularly extending seal assembly 70 located in the housing assembly 12 provides a seal between the yoke 66 and the housing assembly 12.

A front wheel drive gear 72 is rotatably supported upon an enlarged diameter portion 74 of the spindle 60 and is maintained continuously in engagament with the first gear section 56 of the intermediate gear 54 and for a purpose to be presently seen has one more tooth than the drive gear 22. The drive gear 72 is substantially axially restrained on opposite sides by a pair of snap rings 77. The front wheel drive gear 72 has a reduced diameter splined portion 78 on its rearward side.

In the position of the gears in the transfer case 10 as shown in FIGURE 1, as the drive gear 22 is rotated via the transmission output shaft (not shown), the front wheel drive gear 72 is rotated slightly slower (because of the numerical difference of gear teeth) by the drive gear 22 via the first gear section 56 of the intermediate gear member 54. Since, in the position as shown in FIGURE 2, the front wheel drive gear 72 is free to rotate about the front wheel drive spindle 60, no power is transmitted to the front wheels.

A sleeve member 76 has an enlarged diameter bore portion 79 by which the sleeve member is matably, rotatably supported upon the rearward termination of the enlarged diameter portion 74 of drive spindle 60 and is in juxtaposition with a splined portion 78 of drive gear 72. The sleeve member 76 has its outer surface splined and at its rearward end has a reduced diameter bore portion 81 which forms the outer race of a two-way clutch assembly 83.

A front wheel drive and connecting gear member 80 is similar to gear member 44 and is matably splined to the sleeve member 76 via a splined bore 82. The gear member 80 has an annular groove 84 for receiving a bifurcated fork member (not shown) which can be manipulated whereby the position of the gear member 80 can be adjusted axially along the spline of sleeve member 76.

By moving the front wheel drive and connecting gear member 80 to its forwardmost position, the splined bore 82 is placed in splined engagement with the reduced diameter splined portion 78 as well as with the sleeve member 76, thereby coupling the front wheel drive gear 72 to the front wheel drive spindle 60 and hence providing for the automatic transmission of power to the front wheels from the drive gear 22 when the rear wheels begin to slip. This automatic power transmission occurs through the action of the clutch assembly 83 which operates in a manner to be described.

With the gear 80 in its neutral position (as shown in FIGURE 2) the rear wheels can be connected to the main transmission through a low gear ratio in the transfer case 10 by moving the rear wheel drive and connecting gear member 44 axially rearwardly along splined portion 30 and into engagement with the second gear section 58 of the intermediate gear 54. At this time, power is transmitted to the rear wheels from the main transmission via the drive gear 22, the geared engagement of drive gear 22 with the first gear section 56 and of the second gear section 58 with connecting gear 44, and the splined connection between gear 44 and spindle 28.

The vehicle can be placed in an automatic four-wheel drive through the low gear ratio in the transfer case 10 by moving the front drive and connecting gear member 80 to its axially rearwardmost position and into engagement with the second gear section 58 of the intermediate gear member 54. At this time, power is automatically transmitted to the front wheels when the rear wheels slip via the geared engagement of the drive gear 22 with the first gear section 56 and of the second gear section 58 with the front wheel drive and connecting gear 80, the splined connection between gear 80 and sleeve member 76, and thence to the front wheel drive spindle via the operation of the clutch assembly 83.

The clutch assembly 83 includes a roller bearing and cage subassembly 86 which includes an annular cage 88 having a plurality of pockets for retaining a plurality of rollers 90. The clutch assembly 83 further includes a friction drag assembly 92 which comprises an annular friction pad member 94 and a spring retainer 96. The retainer 96 is of a spider construction and has a plurality of circumferentially spaced, axially bent, radially extending resilient legs 98 which are connected at their radially inner ends to the bearing cage 88 and at their radially outer ends to the friction pad member 94. The legs 98 provide a spring action urging the friction pad member 94 against an annular engaging surface 95 on the inside of housing 12 for a purpose to be described.

The roller bearing and cage subassembly 86 is mounted upon a smooth, reduced diameter portion 100 of spindle 60 which acts as an inner race. The outer race portion 81 is provided with a plurality of circumferentially spaced V-shaped grooves 102, each receiving one of the rollers 90 (see FIGURE 2). Each of the grooves 102 is symmetrically formed and generally provides clearance with the associated one of the rollers 90 when centrally located therein but provides an interference therewith as it is rotated relatively thereto. When this interference becomes of a sufficient magnitude the sleeve member 76 and spindle 60 are locked together via the rollers 90. With the transfer case 10 in one of the automatic four-wheel drive conditions previously described as long as the spindle 60 rotates at the same speed or greater than the gear member 80 and sleeve member 76, either the clutch assembly 83 will be maintained in an idle disengaged condition or the spindle 60 will overrun the clutch assembly 83. Under normal driving conditions, the front and rear wheels of the vehicle rotate at the same speed and hence the rear spindle 28 and front spindle 60 rotate at the same speed. Since the front wheel drive gear 72 has one more tooth than its rear wheel counterpart, gear 22, the gear member 80 and sleeve member 76 under normal driving conditions will be rotated slower than the front spindle 60.

The frictional drag on the cage 88 caused by the friction pad 94 tends to move the rollers 90 into engagement with the trailing edges of the V-shaped grooves 102. Since, however, the front spindle 60 is rotating faster than sleeve 76 the rollers will not be locked between outer race 81 and inner race 100 and hence the vehicle will remain in two wheel drive. If the rear wheels lose traction and begin to slip then the one tooth speed differential between gears 22 and 72 will be overcome and the gear member 80 and sleeve member 76 will be rotated faster than front spindle 60, bringing the trailing edges of the V-grooves 102 into engagement with the rollers 90 and hence locking the sleeve member 76 (and gear member 80) to the front spindle 60. Under these conditions, then, the vehicle is in four-wheel drive. If the main transmission of the vehicle is in reverse the same sequence of events occurs except that the opposite edge of the V-grooves 102 engage the rollers 90. Thus, regardless of whether the main transmission is in forward or reverse, with the transfer case in a four-wheel drive condition, high or low gear, the vehicle will automatically be placed in four-wheel drive upon slippage of the rear wheels; under the same conditions of the transfer case 10, the vehicle will be automatically placed into two-wheel drive when the rear wheels cease to slip. Note that the automatic two- to four-wheel drive conversion occurs automatically with the transfer case 10 being driven for either forward or reverse and that no external shifting of the clutch assembly 83 is required.

The drag provided to the roller bearing and cage subassembly by the friction pad 94 will determine the point at which the clutch assembly 83 assumes a locked condition; this drag, of course, is determined in part by the axial pressure exerted by the pad 94 against the face 95 on the housing 12. This axial pressure can be adjusted simply by bending the resilient legs 98 more or less. The opposite end of the cage 88 bears against the shoulder 104 defined by the junction of the enlarged diameter portion 74 and the inner race portion 100. Note that the same axial pressure exerted by pad 94 against face 95 also axially restrains the roller bearing and cage subassembly 83.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an automotive vehicle having a set of front and a set of rear wheels drivable from a source of power, the combination comprising: transmission means selectively operable for coupling the sets of front and rear wheels to the source of power for both forward and reverse driving conditions, said transmission means including first drive means operative for transmitting power substantially continuously to one of the sets of front and rear wheels, said first drive means including a first drive spindle, second drive means actuable for transmitting power to the other of the sets of front and rear wheels, said second drive means including a second drive spindle, an annular member rotatably mounted on said second drive spindle, means connecting said annular member for rotation with said first drive spindle, clutch means operatively associated with said first and second driving means and being self-actuating into an operational condition for both forward and reverse driving conditions for connecting said annular member to said second drive spindle automatically when the one set of wheels has a peripheral linear velocity greater than the other set of wheels and for disconnecting said annular member and said second drive spindle when the one set of wheels has substantially the same peripheral linear velocity as the other set of wheels, said clutch means including a roller bearing and cage subassembly rotatably mounted on said second drive spindle, a portion of said annular member defining an outer race for said subassembly, and means fixed to said subassembly for exerting a drag resisting rotation of said subassembly.

2. In an automotive vehicle having a set of front and a set of rear wheels drivable from a source of power, the combination comprising: transmission means selectively operable for coupling the sets of front and rear wheels to the source of power for both forward and reverse driving conditions, said transmission means including first drive means operative for transmitting power substantially continuously to one of the sets of front and rear wheels, said first drive means including a first drive spindle, second drive means actuable for transmitting power to the other of the sets of front and rear wheels, said second drive means including a second drive spindle, an annular member rotatably mounted on said second drive spindle, means connecting said annular member for rotation with said first drive spindle, clutch means operatively associated with said first and second driving means and being self-actuating into an operational condition for both forward and reverse driving conditions for connecting said annular member to said second drive spindle automatically when the one set of wheels has a peripheral linear velocity greater than the other set of wheels and for disconnecting said annular member and said second drive spindle when the one set of wheels has substantially the same peripheral linear velocity as the other set of wheels, said clutch means including a roller bearing and cage subassembly rotatably mounted on said second drive spindle, a portion of said annular member defining an outer race for said subassembly, and means fixed to said subassembly for exerting a selected axial force between said subassembly and an immovable member for exerting a drag resisting rotation of said subassembly.

3. In an automotive vehicle having a set of front and a set of rear wheels drivable from a source of power, the combination comprising: transmission means selectively operable for coupling the sets of front and rear wheels to the source of power for both forward and reverse driving conditions, said transmission means including first drive means operative for transmitting power substantially continuously to one of the sets of front and rear wheels, said first drive means including a first drive spindle, second drive means actuable for transmitting power to the other of the sets of front and rear wheels, said second drive means including a second drive spindle, an annular member rotatably mounted on said second drive spindle, means connecting said annular member for rotation with said first drive spindle, clutch means operatively associated with said first and second driving means and being self-actuating into an operational condition for both forward and reverse driving conditions for connecting said annular member to said second drive spindle automatically when the one set of wheels has a peripheral linear velocity greater than the other set of wheels and for disconnecting said annular member and said second drive spindle when the one set of wheels has substantially the same peripheral linear velocity as the other set of wheels, said clutch means including a roller bearing and cage subassembly rotatably mounted on said second drive spindle, a portion of siad annular member defining an outer race for said subassembly, axially fixed stop means engageable with one end of said subassembly, said clutch means further including pressure means fixed to the other end of said subassembly for exerting a selected axial force between said subassembly, and hence said stop means, and an immovable member for exerting a drag resisting rotation of said subassembly.

4. In an automotive vehicle having a set of front and a set of rear wheels drivable from a source of power, the combination comprising: transmission means selectively operable for coupling the sets of front and rear wheels to the source of power for both forward and reverse driving conditions, said transmission means including first drive means operative for transmitting power substantially continuously to one of the sets of front and rear wheels, said first drive means including a first drive spindle, second drive means actuable for transmitting power to the other of the sets of front and rear wheels, said second drive means including a second drive spindle, an annular member rotatably mounted on said second drive spindle, means connecting said annular member for rotation with said first drive spindle, clutch means operatively associated with said first and second driving means and being self-actuating into an operational condition for both forward and reverse driving conditions for connecting said annular member to said second drive spindle automatically when the one set of wheels has a peripheral linear velocity greater than the other set of wheels and for disconnecting said annular member and said second drive spindle when the one set of wheels has substantially the same peripheral linear velocity as the other set of wheels, said clutch means including a roller bearing and cage subassembly rotatably mounted on said second drive spindle, a portion of said annular member defining an outer race for said subassembly, axially fixed stop means engageable with one end of said subassembly, said clutch means further including pressure means fixed to the other end of said subassembly for exerting a selected axial force between said subassembly, and hence said stop means, and an immovable member for exerting a drag resisting rotation of said subassembly, said pressure means including an annularly disposed pressure pad, a plurality of resilient radially extending, axially bent, and circumferentially disposed leg portions connected at their radially outer ends to said pressure pad, and means connecting the radially inner ends of said leg portions to said subassembly.

5. In an automotive vehicle having a set of front and a set of rear wheels drivable from a source of power, the combination comprising: transmission means selectively operable for coupling the sets of front and rear wheels to the source of power for both forward and reverse driving conditions, said transmission means including first drive means operative for transmitting power substantially continuously to one of the sets of front and rear wheels, said first drive means including a first drive spindle, second drive means actuable for transmitting power to the other of the sets of front and rear wheels, said second drive means including a second drive spindle, an annular member rotatably mounted on said second drive spindle, means connecting said annular member for rotation with said first drive spindle, clutch means operatively associated with said first and second driving means and being self-actuating into an operational condition for both forward and reverse driving conditions for connecting said annular member to said second drive spindle automatically when the one set of wheels has a peripheral linear velocity greater than the other set of wheels and for disconnecting said annular member and said second drive spindle when the one set of wheels has substantially the same peripheral linear velocity as the other set of wheels, said clutch means including a roller bearing and cage subassembly rotatably mounted on said second drive spindle, a portion of said annular member defining an outer race for said subassembly, axially fixed stop means engageable with one end of said subassembly, said clutch means further including pressure means fixed to the other end of said subassembly for exerting a selected axial force between said subassembly, and hence said stop means, and an immovable member for exerting a drag resisting rotation of said subassembly, said outer race having a plurality of grooves each receiving one of the plurality of rollers of said subassembly, said grooves having opposite side portions inclining divergently, radially inwardly to define a preselected restriction on each side for the associated one of the rollers, said pressure means including an annularly disposed pressure pad, a plurality of resilient radially extending, axially bent, and circumferentially disposed leg portions connected at their radially outer ends to said pressure pad, and means connecting the radially inner ends of said leg portions to said subassembly.

6. An overrunning clutch assembly comprising: inner and outer race members, a plurality of roller members located between said race members, an annular cage member having a plurality of pockets for receiving said roller members, a plurality of resilient, radially extending and circumferentially disposed leg portions, means connecting said leg portions at one radial extremity to said cage, and annularly disposed, axially facing friction means connected to the opposite radial extremity of said leg portions, one of said race members having a plurality of grooves each receiving one of said roller members, each of said grooves having a side portion inclining radially inwardly to define a preselected restriction on that side for said one of said rollers.

7. An overrunning clutch assembly comprising: inner and outer race members, a plurality of roller members located between said race members, an annular cage member having a plurality of pockets for receiving said roller members, a plurality of resilient, radially extending, axially bent and circumferentially disposed leg portions, means connecting said leg portions at one radial extremity to one end of said cage, and an annular, axially facing, friction ring member connected to the opposite radial extremity of said leg portions whereby said ring member can be urged into frictional engagement against a mating surface by a selected resilient preload exerted by said leg portions, one of said race members having a plurality of grooves each receiving one of said roller members, each of said grooves having opposite side portions inclining divergently radially inwardly to define a preselected restriction on each side for said one of said rollers.

8. An overrunning clutch assembly comprising: inner and outer race members, a plurality of roller members located between said race members, an annular cage member having a plurality of pockets for receiving said roller members, a plurality of resilient, radially extending, axially bent and circumferentially disposed leg portions, means connecting said leg portions at their radially inner extremities to one end of said cage, and an annular ring member having an axially facing friction surface and being connected to the radially outer extremity of said leg portions whereby said ring member can be urged into frictional engagement against a mating surface by a selected resilient preload exerted by said leg portions, one of said race members having a plurality of grooves each receiving one of said roller members, each of said grooves having opposite side portions inclining divergently radially inwardly to define a preselected restriction on each side for said one of said rollers.

9. An overrunning clutch assembly comprising: inner and outer race members, said inner race member being a rotatable shaft and said outer race member being an annular member having a splined outer surface, a plurality of roller members located between said race members, an annular cage member having a plurality of pockets for receiving said roller members, a plurality of resilient, radially extending, axially bent and circumferentially disposed leg portions, means connecting said leg portions at their radially inner extremities to one end of said cage, and an annular ring member having an axially facing friction surface and being connected to the radially outer extremity of said leg portions whereby said ring member can be urged into frictional engagement against a mating surface by a selected resilient preload exerted by said leg portions, one of said race members having a plurality of grooves each receiving one of said roller members, each of said grooves having opposite side portions inclining divergently raidally inwardly to define a preselected restriction on each side for said one of said rollers.

10. The clutch assembly of claim 9 with one of said race members being said outer race member.

References Cited by the Examiner

UNITED STATES PATENTS

| | | | |
|---|---|---|---|
| 2,173,044 | 9/1939 | Ruggles | 74—333 X |
| 2,185,636 | 1/1940 | Kysor | 180—44 |
| 2,314,833 | 3/1943 | Keese | 180—44 X |
| 2,785,582 | 3/1957 | Banker | 74—368 X |
| 2,796,941 | 6/1957 | Hill | 180—44 |
| 2,851,115 | 9/1958 | Buckendale | 180—44 X |
| 2,946,238 | 6/1960 | Beyerstedt | 74—333 X |
| 2,959,237 | 11/1960 | Hill | 180—44 |

FOREIGN PATENTS 656,242  8/1951  Great Britain.

OTHER REFERENCES

Product Engineering, March 17, 1958, page 84.

A. HARRY LEVY, *Primary Examiner.*

BENJAMIN HERSH, *Examiner.*

W. A. MARCONTELL, *Assistant Examiner.*

UNITED STATES PATENT OFFICE
CERTIFICATE OF CORRECTION

Patent No. 3,295,625                                    January 3, 1967

Miguel A. Ordorica et al.

It is hereby certified that error appears in the above numbered patent requiring correction and that the said Letters Patent should read as corrected below.

Column 8, line 31, for "raidally" read -- radially --; line 33, before "one" insert -- said --.

Signed and sealed this 26th day of September 1967.

(SEAL)
Attest:

ERNEST W. SWIDER
Attesting Officer

EDWARD J. BRENNER
Commissioner of Patents